United States Patent [19]

Enzmann et al.

[11] 4,444,000

[45] Apr. 24, 1984

[54] HARVESTER HEADER CONSTRUCTION

[75] Inventors: Michael H. Enzmann, Blue Springs; Lyle L. Jensen, Independence, both of Mo.

[73] Assignee: Allis-Chalmers Corporation, Milwaukee, Wis.

[21] Appl. No.: 383,741

[22] Filed: Jun. 1, 1982

[51] Int. Cl.³ .......................................... A01D 35/12
[52] U.S. Cl. .................................... 56/15.6; 56/14.6; 56/DIG. 9
[58] Field of Search ............... 56/228, 208, 210, 15.6, 56/14.6, DIG. 9

[56] References Cited

U.S. PATENT DOCUMENTS

| | | | |
|---|---|---|---|
| 3,431,711 | 3/1969 | Claas | 56/15.6 |
| 4,011,709 | 3/1977 | Mott et al. | 56/10.4 |
| 4,206,584 | 6/1980 | Johnson et al. | 56/210 |
| 4,266,391 | 5/1981 | McDuffie et al. | 56/14.5 |
| 4,267,687 | 5/1981 | Neuhring | 56/DIG. 9 |
| 4,315,395 | 2/1982 | Randall et al. | 56/DIG. 9 |

*Primary Examiner*—John J. Wilson
*Attorney, Agent, or Firm*—Charles L. Schwab

[57] ABSTRACT

A harvester header (12) of the detachable type is provided with a transverse hollow beam (46) at its lower rear which optimizes available space. The beam (46) is of quadrilateral cross section with its rear wall (51) presenting openings (71, 72, 111, 112) beneath the header discharge opening (19) for centering and latching the header (12) to the feeder conveyor housing (13). The top wall (53) of the beam (46) slopes forwardly and downwardly in parallel supporting relation to the rear portion (39) of the header floor (36).

2 Claims, 5 Drawing Figures

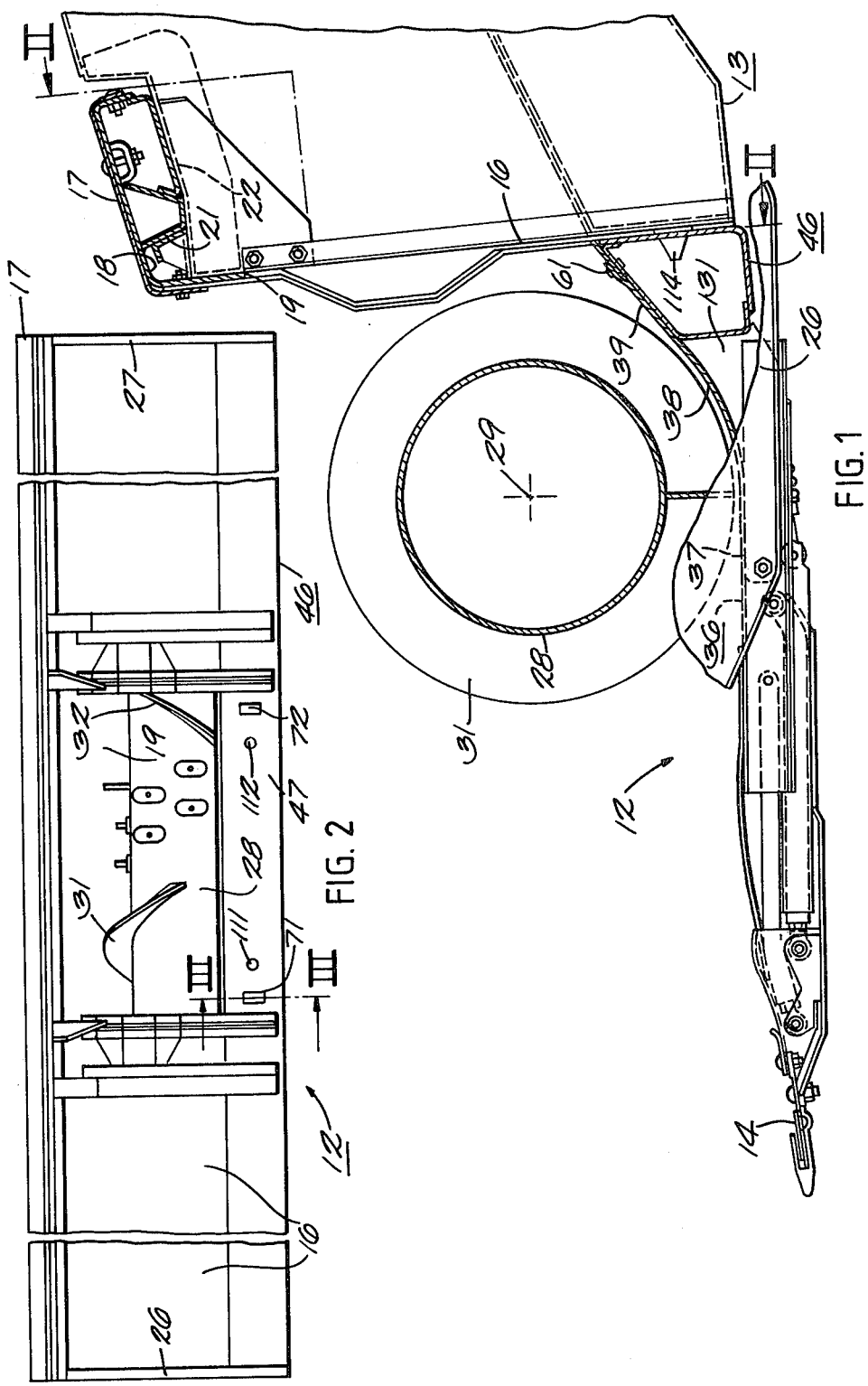

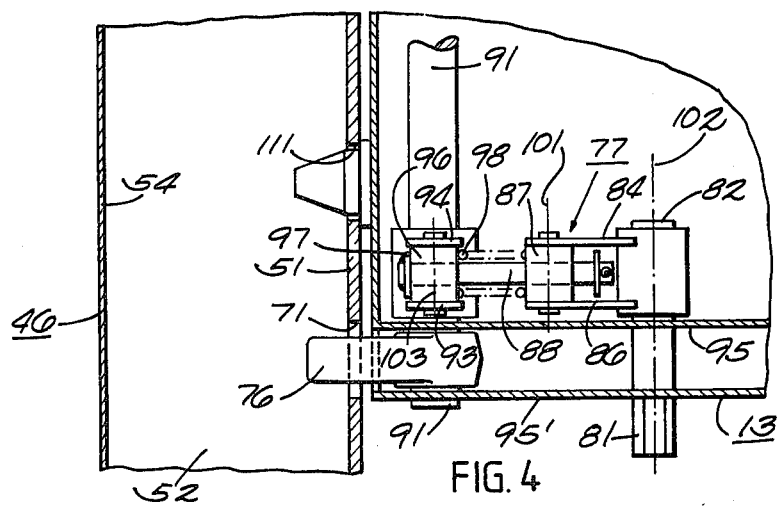
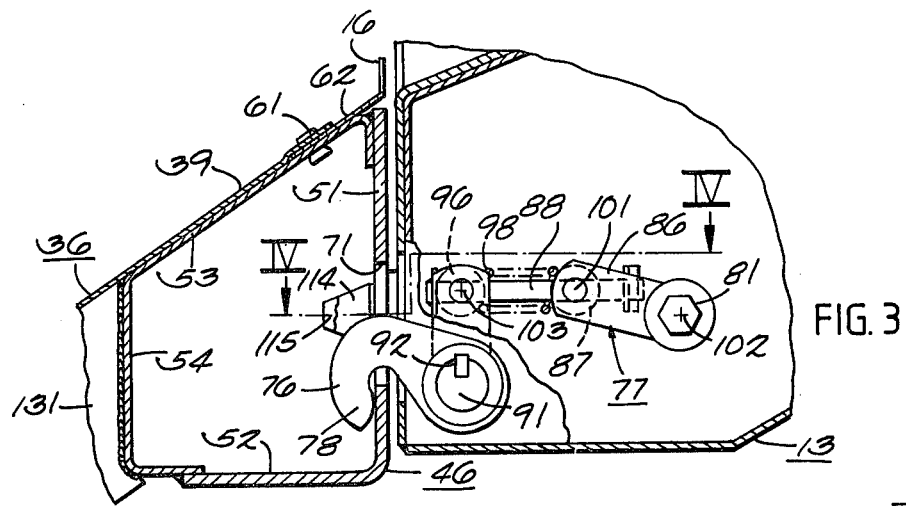
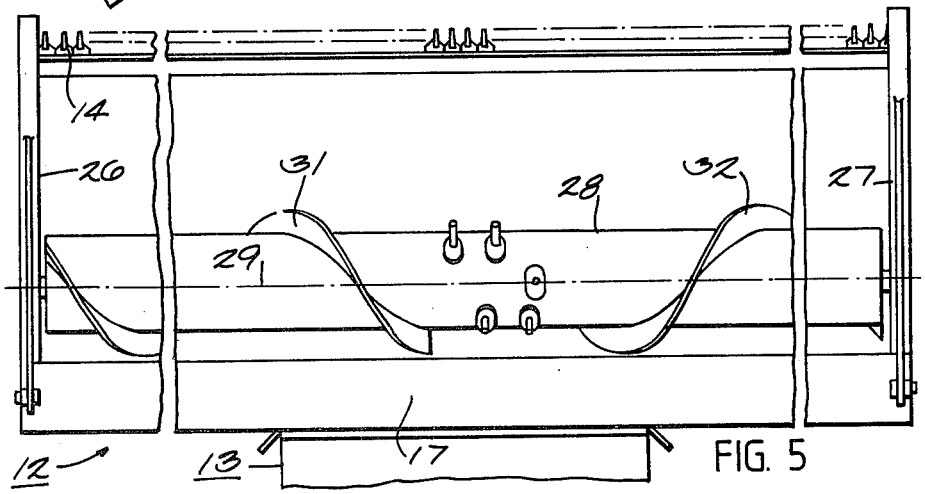

HARVESTER HEADER CONSTRUCTION

BACKGROUND OF THE INVENTION

1. Technical Field

This invention relates to the construction of a header for a harvester and more particularly to the construction and arrangement of a transverse beam at the lower rear of the header.

2. Prior Art

Heretofore, others have used transverse beams at the lower rear of headers such as a hollow cylindrical tube type transverse beam shown in U.S. Pat. No. 4,011,709. In U.S. Pat. No. 4,266,391 a header frame is illustrated in which beams of quadrilateral cross section are used.

BRIEF DESCRIPTION OF THE INVENTION

The header of this invention is adapted for connection to the front end of a feeder housing of a harvester which is capable of harvesting a swath of crop of predetermined width. Normally, the connection of the header to the feeder housing is releasable to permit different types of headers to be attached for harvesting different crops such as corn, soy beans and the like. The header has a pair of laterally opposite outer ends, an upright back wall extending between the opposite ends with a central opening for discharging crop material to a the feeder housing and a transverse auger which is disposed between the laterally opposite outer ends and rotates about a transverse axis. The transverse auger includes flights, the outer periphery of which define a transverse cylinder and which are capable of moving the crop material to a central portion where it is discharged through the central opening. The header has a bottom structure between the opposite ends of the header including a floor having a flat forward portion extending rearwardly to approximately directly below the axis of the auger, a concave intermediate portion which curves upwardly and rearwardly with a curvature generally complimentary to the transverse cylinder defined by the periphery of the auger flights and a flat rearward portion sloping upwardly and rearwardly from the intermediate portion toward the back wall of the header. A hollow beam of quadilateral cross-section extends between opposite ends of the header and is disposed at the lower rear thereof below the central opening. The hollow beam has an upwardly extending rear wall generally aligned with the header back wall and a substantially horizontally bottom wall, the hollow beam also includes a top wall which slopes downwardly and forwardly from the top of the back wall parallel to and in supporting relation to the rearward portion of the floor. The portion of the rear wall beneath the central opening of the header back wall presents a pair of laterally spaced latch openings for receiving movable parts of a pair of latches which are insertable into the latch openings for engagement with the front side of the rear wall of the hollow beam, thus effecting a latched engagement between the feeder housing in the header.

The header may also include at least one centering pin opening in the rear wall beneath the central opening which receives a centering pin on the feeder housing to properly position the header as it is attached to the feeder housing.

BRIEF DESCRIPTION OF THE DRAWINGS

One embodiment of the invention is illustrated in the drawings in which:

FIG. 1 is a section of a harvester header;

FIG. 2 is a view taken along the line II—II in FIG. 1;

FIG. 3 is a view taken along the line III—III in FIG. 2;

FIG. 4 is a view taken along the line IV—IV in FIG. 3; and

FIG. 5 is a top view of the header shown in FIG. 1.

DETAILED DESCRIPTION OF THE INVENTION

Referring to FIGS. 1 and 2, a header 12 is releasably mounted on a feeder housing 13 at the front of a mobile harvester or combine and is adapted to sever standing crop material through operation of a reciprocating sickle 14 at the forward end of the header 12.

The back wall 16 of the header 12 includes an upper transverse beam portion 17 having a pocket 18 above the central crop discharging opening 19. A hook portion 21 at the upper front of the feeder houser 13 engages the pocket 18 and an upper transverse wall 22 of the feeder housing is in supporting relation to the underside of the upper transverse beam 17. The header 12 includes laterally opposite vertical ends or end walls 26, 27 between which and on which a transverse auger 28 is rotatably mounted for rotation about a horizontal transverse axis 29. The auger 28 includes spiral flights 31, 32, the outer periphery of which define a cylinder whose underside is immediately above a floor structure or floor 36 of the header. The floor 36 includes a flat front portion 37 extending rearwardly to a point directly below the axis 29 of the auger 28, a concave or curved intermediate portion 38 extending rearwardly from the front portion 37 curving upwardly and rearwardly at a curvature complimentary to the auger periphery and a flat rear portion 39 which slopes upwardly and rearwardly from the rear end of the curved portion 38.

A hollow quadrilateral section beam 46 is disposed at the lower rear of the header 12 and extends between and is secured to the opposite ends 26, 27 of the header. The beam 46 serves as a main structural member of the header 12 and includes a central portion 47 extending beneath the opening 19 in the back wall 16. The beam 46 includes a generally upright rear wall 51, a generally horizontal bottom wall 52 extending forwardly from the lower end of the rear wall 51, a top wall 53 which slopes downwardly and forwardly from the top end of the rear wall 51 and a generally upright front wall 54 interconnecting the front end of the bottom wall 52 with the front end of the top wall 53. As illustrated, the transverse beam 46 has a right trapizoidal cross-section shape with the downwardly and forwardly sloping top wall 53 being parallel to and in underlying supporting relation to the upwardly and rearwardly sloping flat rear portion 39 of the floor 36. Fastening means, in the form of rivets 61, secure the rear end of the floor 36 and a forward extending flange 62 of the back wall 16 to the top wall 53 of the support beam 46. It will be noted that the rear wall 51 is in general alignment with the back wall 16 of the header 12.

In the portion 47 of the transverse beam 46 beneath the central discharge opening 19 in the header back wall 16, wall means provide a pair of vertically extending slots or latch openings 71, 72 in the rear wall 51. As shown in FIGS. 3 and 4, slot 71 receives a pivotal latch part 76 of a latching mechanism 77. As illustrated in FIGS. 3 and 4, the movable latch part 76 is in a latching position of adjustment wherein its finger 78 engages the front side of the rear wall 521 thereby keeping the lower rear of the header secured to the lower front of the feeder housing 13. The latching mechanism 77 is operated by applying a wrench to a hex shaped end 81 on a shaft 82. The shaft 82 includes a pair of flanges 84, 86 which are pivotally connected to a cylindrical part 87 having a transverse opening receiving a slide rod 88. The latch part 76 is keyed to a transverse shaft 91 by a key 92 and a pair of upstanding flanges 93, 94 are secured to the shaft 91 for rotation therewith. The shafts 82 and 91 are pivotally supported on vertical walls 95, 95' at one lateral side of the housing 13. The flanges 93, 94 pivotally mount a cylindrical part 96 having a transverse opening through which the rod 88 extends. A washer 97 is welded to the front end of the rod 88 and a coil spring 98 is disposed between the cylindrical parts 96, 87. The spring serves to resiliently maintain the latch in its latching position, illustrated in FIGS. 3 and 4, because of the overcenter position of the axis 101 of the pivot connection between the cylindrical part 87 and the flanges 84, 86 in relation to a plane through the axis 102 of shaft 82 and the axis 103 of the pivot connection between the cylindrical part 96 and the flanges 93, 94. When the latch is adjusted to its nonlatching position by pivoting the shaft 82 counterclockwise as viewed in FIG. 3, the latch part 76 will pivot clockwise and the pivot axis 101 will move to an overcenter position below a plane through the axis 102 and 103 whereby the spring 98 serves to resiliently maintain the latch in its nonlatching position. Although not illustrated, a reverse image latch is provided at the other side of the feeder housing 13 with a latch part secured to the shaft 91 for registration with latch opening 72 in the transverse beam 46.

A pair of centering pin receiving openings 111, 112 are formed in the rear wall 51 of the beam 46 below the opening 19. During hookup of the header 12 with the feeder housing 13 the openings 111, 112 receive centering pins 114, 115 on the front of the housing 13 thereby properly centering the header 12 relative to the combine and insuring alignment of the latch parts 76 with the latch openings 71, 72.

From the foregoing description it will be apparent that applicants' have provided a support beam which optimizes use of the space it occupies at the lower rear of the header. By constructing the top wall of the support beam to slope downwardly and forwardly in a parallel relation to the flat rear portion 39 of the floor 36, separate support means are not required for the rear of the floor 36. Also the front wall 54 of the beam is used to support forwardly projecting floor support flanges 131 and the rear wall 51 includes wall means presenting latch openings 71, 72 and centering pin openings 111, 112. In the illustrated embodiment of the invention, the rear and bottom walls 51, 52 are formed by bending a single plate member and the top and front walls 53 and 54 are formed by bending a single plate member of lessor thickness and then welding the two together as illustrated.

The embodiments of the invention in which an exclusive property or privilege is claimed are defined as follows:

1. In a harvester having a feeder housing and a crop header connected to the front end of said feeder housing, said header including a pair of laterally opposite outer ends, an upright back wall extending between said opposite ends with a central opening for discharge of crop material to said feeder housing, a transverse auger forwardly of said back wall having flights the outer peripheries of which define a transverse cylinder, said auger extending between said opposite ends and being rotatable about its transverse axis, and a bottom structure including a floor between said opposite ends having a flat front portion extending rearwardly to approximately directly below said transverse axis of said auger, a concave intermediate portion curving upwardly and rearwardly at a curvature generally complimentary to said transverse cylinder and a flat rear portion sloping upwardly and rearwardly from said intermediate portion toward said back wall, and a hollow beam of quadrilateral cross section extending between and secured to said opposite ends and disposed at the lower rear of said header below said central opening, said hollow beam having an upwardly extending rear wall generally aligned with said header back wall, a substantially horizontal bottom wall and a top wall sloping downwardly and forwardly from the top of said rear wall parallel to and in supporting relation to said rear portion of said floor, said rear wall of said beam having wall means defining laterally spaced latch openings in the portion of said rear wall of said beam beneath said central opening, said feeder housing including a pair of latches with movable latch parts releasably inserted through said latch openings and releasably engaging the front side of the rear wall of said beam.

2. The header of claim 1 and further comprising wall means defining at least one centering pin opening in the rear wall beneath said central opening and wherein said feeder housing includes a forwardly extending centering pin engageable with said centering pin opening.

* * * * *